(12) United States Patent
Wong et al.

(10) Patent No.: US 10,730,789 B2
(45) Date of Patent: Aug. 4, 2020

(54) SWITCHABLE LIQUID REPELLENT AND ACTIVE WATER HARVESTING SURFACE

(71) Applicant: The Penn State Research Foundation, University Park, PA (US)

(72) Inventors: Tak-Sing Wong, University Park, PA (US); Yu Huang, University Park, PA (US); Birgitt Boschitsch, University Park, PA (US); Nan Sun, University Park, PA (US)

(73) Assignee: The Penn State Research Foundation, University Park, PA (US)

( * ) Notice: Subject to any disclaimer, the term of this patent is extended or adjusted under 35 U.S.C. 154(b) by 65 days.

(21) Appl. No.: 15/831,930

(22) Filed: Dec. 5, 2017

(65) Prior Publication Data
US 2018/0155239 A1 Jun. 7, 2018

Related U.S. Application Data (60) Provisional application No. 62/430,169, filed on Dec. 5, 2016.

(51) Int. Cl.
| | | |
|---|---|---|
| *C03C 17/34* | (2006.01) | |
| *C03C 17/30* | (2006.01) | |
| *C03C 17/32* | (2006.01) | |
| *C09D 5/16* | (2006.01) | |
| *C09D 7/40* | (2018.01) | |
| *C03C 17/42* | (2006.01) | |

(Continued)

(52) U.S. Cl.
CPC .......... *C03C 17/3405* (2013.01); *C03C 17/30* (2013.01); *C03C 17/32* (2013.01); *C03C 17/42* (2013.01); *C09D 5/1675* (2013.01); *C09D 5/1681* (2013.01); *C09D 7/69* (2018.01); *C03C 2217/445* (2013.01); *C03C 2217/48* (2013.01); *C03C 2217/76* (2013.01); *C03C 2218/116* (2013.01); *C03C 2218/322* (2013.01); *C08K 3/08* (2013.01); *C08K 7/18* (2013.01); *C08K 2003/0856* (2013.01); *C08K 2201/01* (2013.01)

(58) Field of Classification Search
CPC ..... C03C 17/3405; C03C 17/32; C03C 17/30; C03C 2217/76; C03C 2218/116; C03C 2218/322; C03C 2217/48; C03C 2217/445; C03C 17/42; C08K 2201/01; C08K 2003/0856; C08K 3/08; C08K 7/18; C09D 5/1675; C09D 7/69; C09D 5/1681

See application file for complete search history.

(56) References Cited

U.S. PATENT DOCUMENTS

| | | | |
|---|---|---|---|
| 2012/0276334 A1* | 11/2012 | Fedynyshyn | ............ B05D 5/04 428/141 |
| 2015/0175814 A1* | 6/2015 | Aizenberg | .............. B08B 17/06 428/312.8 |
| 2016/0040030 A1* | 2/2016 | Kusuura | ............... C09D 153/00 427/542 |

OTHER PUBLICATIONS

D. Daniel et al., "Lubricant-infused micro/nano-sctructured surfaces with tunable dynamic omniphobicity at high temperatures," Appl. Phys. Lett. 2013, 102, 231603.

(Continued)

*Primary Examiner* — Nathan L Van Sell
(74) *Attorney, Agent, or Firm* — Dinsmore & Shohl LLP (57) ABSTRACT

A substrate with a switchable surface has been developed that can rapidly switch its surface character such as between two distinct liquid-repellent modes: (1) a superhydrophobic mode and (2) a slippery mode. Such surfaces have demonstrated adaptive liquid repellency and water harvesting capabilities.

11 Claims, 6 Drawing Sheets

(51) Int. Cl.
*C08K 7/18* (2006.01)
*C08K 3/08* (2006.01)

(56) References Cited

OTHER PUBLICATIONS

M. Y. Cao, et al., "Facile and Large-Scale Fabrication of a Cactus-Inspired Continuous Fog Collector," Adv. Functional Materials, 2014, 24, pp. 3235-3240.
T.S. Wong et al., "Bioinspired self-reparing slippery surfaces with pressure-stable omniphobicity," Nature, vol. 477, Sep. 22, 2011, pp. 443-447.
X. Yao et al., "Adaptive fluid-infused porous films with tunable transparency and wettability," Nature Materials, vol. 12, Jun. 2013, pp. 529-534.

\* cited by examiner

SWITCHABLE LIQUID REPELLENT AND ACTIVE WATER HARVESTING SURFACE

CROSS-REFERENCE TO RELATED APPLICATION

This application claims the benefit of U.S. Provisional Application No. 62/430,169 filed 5 Dec. 2016 the entire disclosure of which is hereby incorporated by reference herein.

STATEMENT REGARDING FEDERALLY SPONSORED RESEARCH

This invention was made with government support under Grant No. CMM11351462 awarded by the National Science Foundation, under Grant No. N00014-12-1-0875 awarded by the Office of Naval Research and under Grant No. D14AP00042 awarded by Defense Advanced Research Projects Agency. The Government has certain rights in the invention.

TECHNICAL FIELD

The present disclosure relates to a substrate having a surface that can switch from a hydrophobic state to a slippery state and in particular to a substrate surface including an array of responsive micropillars having a lubricant layer conformally infused thereon which can change orientation.

BACKGROUND

Biologically inspired surfaces are typically modeled after the surface properties of one particular species or combine those of multiple biological species to create a cross-species surface. Among the latter types of bioinspired surfaces, those that selectively switch between different functional states are rare.

From the exceptional camouflage capabilities of the cuttlefish and chameleon to the changeable wettability of the honeybee tongue, physical materials that can change their interfacial properties on-demand allow them to interact with their dynamic environments effectively. While materials with dynamic optical properties can be readily found in nature, natural surfaces that can dynamically alter their liquid-repellent functions are rare. Rather, while there are various liquid-repellency strategies among different natural species, all of them rely on static surface textures.

Synthetic liquid-repellent surfaces are primarily modeled after two classes of biological surfaces. The first class of surfaces, known as superhydrophobic surfaces, relies on air-infused solid textures to repel impinging liquid droplets. These surfaces are modeled after natural surfaces such as lotus leaves and springtails. The second class of surfaces, called slippery liquid-infused porous surfaces (SLIPS), utilize liquid-infused solid textures to repel immiscible fluids in a manner similar to that of the pitcher plant peristome. See T. S. Wong, et al. *Nature* 2011, 477, 443.

Owing to the presence of an air-layer, superhydrophobic surfaces are known for their excellent self-cleaning properties and high droplet mobility. However these surfaces often fail to maintain these properties when under significant pressure, or in high humidity environments, or at elevated temperatures. On the other hand, SLIPS are known for their exceptional liquid repellency in extreme pressure, temperature, or humidity conditions. However, these surfaces typically display lower droplet shedding speeds compared to their superhydrophobic counterparts. See D. Daniel, et al., *Appl. Phys, Lett* 2013, 102, 231603.

While synthetic surfaces with switchable wettability have been proposed (see X. Yao, et al., *Nat. Mater* 2013, 12, 529, none of these surfaces are capable of dynamically switching between superhydrophobic and SLIPS (hereafter "slippery") modes. A surface that can dynamically switch between such modes could maintain liquid-repellency over a broad range of environmental conditions, and could display high droplet mobility when environmental conditions allow.

SUMMARY OF THE DISCLOSURE

An advantage of the present disclosure is a substrate with a switchable surface that can switch between a superhydrophobic state and a slippery state by changing the orientation of an array of magnetically responsive micropillars on the surface. Such surfaces are useful for water harvesting devices among others.

These and other advantages are satisfied, at least in part, by a substrate with a switchable surface comprising an array of magnetically responsive hierarchical micropillars and a lubricant layer conformally infused thereon wherein each of the micropillars comprise a magnetically responsive particle and a flexible polymer.

Embodiments include one or more of the following features individually or combined. For example, the magnetically responsive particle can be a metal particle such as an iron microsphere. In some embodiments, the flexible polymer comprises polydimethylsiloxane. In other embodiments, the lubricant comprises a perfluorinated oil or a silicone oil or a liquid polydimethylsiloxane or a liquid hydroxy polydimethylsiloxane. In still further embodiments, the hierarchical micropillars comprise nanostructures on the surfaces of the micropillars.

In practicing aspects of the present disclosure, the substrate surface can switch its surface character by changing an orientation of the array with an external magnetic field. Advantageously, changing the orientation of the array results in switching between superhydrophobic and slippery states. This can occur quickly and repeatedly, which allows maintenance of liquid repellency in fast changing dynamic environmental conditions. Embodiments include orienting the array predominately perpendicular relative to the substrate or orienting the array predominately parallel relative to the substrate.

Another aspect of the present disclosure includes a water harvesting device that includes a switchable surface comprising an array of magnetically responsive hierarchical micropillars and a lubricant layer conformally infused thereon wherein each of the micropillars comprise a magnetically responsive particle and a flexible polymer. Such a switchable surface can be used to capture water droplets. For example, in the superhydrophobic state, the high surface area of micropillars allows the rapid collection of tiny water droplets in air. Once the captured condensate volume is sufficiently large, the transformable surface can be switched to the slippery state to remove the excess condensate by gravity. The water harvesting device can also include a programmable controller programmed to switch the surface based on the environmental conditions (e.g., humidity, wind speed and direction etc.).

Another aspect of the present disclosure includes a process of fabricating a switchable surface. The process includes applying a compositing including polymer forming ingredients, a curing agent, and magnetically responsive particles onto a substrate; forming micropillars infused with magnetic nanoparticles by curing the composition in the presence of a magnetic field; forming a textured surface on the micropillars; and silanizating the surface of the hierarchal micropillars and applying a lubricate on the silanized hierarchal micropillars.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

Reference is made to the attached drawings, wherein elements having the same reference numeral designations represent similar elements throughout and wherein:

FIGS. 2a through 2f illustrate fabrication of a switchable surface and its shape shifting performance under different magnetic field directions according to an embodiment of the present disclosure.

FIGS. 3a through 3c illustrate a switchable surface that can transform between superhydrophobic and slippery states.

FIGS. 4a-4c illustrate switching time and cyclability between superhydrophobic and slippery states.

FIGS. 5a-5b illustrate examples of using a switchable surface comprising an array of magnetically responsive hierarchical micropillars.

DETAILED DESCRIPTION OF THE DISCLOSURE

Here, we designed a magnetically transformable surface that can reversibly switch between the lotus and the pitcher plant mode. That is, we have shown that the surface can form air-infused textures to repel impinging liquid droplets in a manner similar to that of a lotus leaf, and can be reversibly transformed into a liquid-infused textured surface to maintain a highly slippery interface akin to the peristome of a pitcher plant.

By switching the liquid-repellent state on-demand, our transformable surface maintains high droplet mobility in the lotus mode and can retain its liquid-repellent function under high pressure conditions in the pitcher plant mode. We have demonstrated that the transformable surface can be used for adaptive liquid repellency and programmable fluid collection and transport. The ability to dynamically alter liquid-repellent properties on-demand allows for smart liquid-repellent skin, programmable fluid collection and transport, adaptive drag control, thermal regulation, and controlled-release devices.

In an aspect of the present disclosure, a magnetically transformable surface that can switch between a superhydrophobic state and a slippery state is provided. In an embodiment of the present disclosure, a substrate with a switchable surface can include an array of magnetically responsive hierarchical micropillars and a lubricant layer conformally infused on the micropillars. Advantageously, each of the micropillars comprises a magnetically responsive particle and a flexible polymer.

Figure 1:
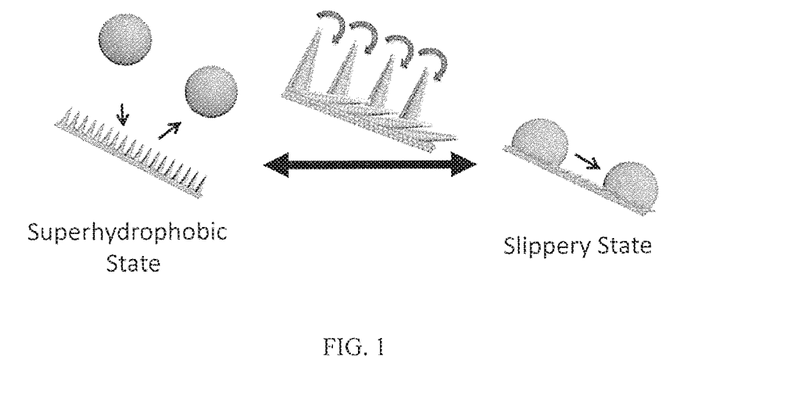
FIG. 1 is a schematic illustration showing a transformable surface including micropillars, whose orientations can be controlled by the direction of an external magnetic field. When the micropillars are oriented perpendicular to the substrate, an impacting liquid droplet is in the Cassie state, and the surface is in superhydrophobic mode, mimicking that of the lotus leave; when the micropillars lay flat under an external magnetic field, an impinging droplet interacts with a nearly continuously film of lubricant-infused surface mimicking the slipperiness of the rim of a pitcher plant.

The orientations of the lubricated micropillars can be controlled by the direction of external magnetic fields. In the superhydrophobic state, the micropillars are oriented predominately vertically (i.e., predominately perpendicular relative to the substrate) so that a liquid droplet predominately touches the tips of the hydrophobic micropillars. In the slippery state, the micropillars predominately lay flat against the substrate (i.e., predominately parallel relative to the substrate), where an impacting droplet touches a nearly continuous film of lubricant-infused surface (see FIG. 1). Switching between superhydrophobic and slippery states can be easily controlled by external magnetic field. Advantageously, switching between superhydrophobic and slippery states can occur quickly and repeatedly, which allows maintenance of liquid repellency in fast changing dynamic environmental conditions.

To switch the surface character of a substrate, e.g., create both the superhydrophobic and slippery states within a surface, both the geometrical parameters and the mechanical properties of the micropillars should be appropriately designed. Specifically, soft polymeric micropillars are used to allow for complete bending under the magnetic field to create the slippery state. Additionally, these pillars should be rigid enough to withstand the drop impact in the superhydrophobic state.

To maintain the superhydrophobic state, the micropillars can be designed to prevent the impacting droplets from transitioning from the Cassie state (i.e., droplet on a stable air-layer) to the Wenzel state (i.e., droplet is fully impregnated into the textures). With this in mind, the micropillars were designed to meet three criteria: I) the Cassie state is the preferable state; II) the surface exhibits high pressure stability, and III) individual pillars are rigid enough to prevent buckling upon drop impact (Supplementary Information).

To satisfy criteria (I), the intrinsic contact angle of the material, $\theta$, has to be larger than $\theta_c$, the critical angle below which Cassie-to-Wenzel transition is favorable, $$\cos\theta_c = (\Phi_s - 1)/(R - \Phi_s) \qquad (1)$$

where $\Phi_s$ is the solid fraction and R is the roughness, defined as the ratio between real surface area and the projected surface area. For example, a surface consisting of cylindrical pillars of height h, interpillar spacing L, and diameter w arranged in square packing (we model our microtextures as regularly spaced cylinders for simplicity; in reality our textures are conical-like and randomly spaced), the solid fraction and the roughness can be expressed by $$\Phi_S = \frac{\pi w^2}{4(L+w)^2} \text{ and } R = \frac{\pi w h}{(L+w)^2} + 1,$$

respectively. To further prevent the Cassie-to-Wenzel transition for the impinging droplets and satisfy criteria (II), the maximum pressure difference across the liquid-plastron interface before wetting occurs ($\Delta P_{max}$) should exceed the dynamic pressure of the droplet ($P_d = \frac{1}{2}\rho V^2$)[12], $$P_d < \Delta P_{max} = \frac{-4\gamma \cos\theta_A}{L} \qquad (2)$$

where $\rho$, V, and $\gamma$ are, respectively, the density, velocity impact, and surface tension of the droplet, and $\theta_A$ is the advancing contact angle.

To satisfy criteria (III), the critical buckling stress ($P_B$) of the micropillar arrays have to sustain the dynamic pressure of the droplets in order to maintain the superhydrophobic state. It can be shown that $P_8$ can be expressed as (Supplementary Information), $$P_d < P_B = \frac{\pi^2 EI}{4h^2} \cdot \frac{\Phi_S}{A_{pillar}} \qquad (3)$$

where I is the second moment of inertia of the pillar cross-section, and $A_{pillar}$ and E are the cross sectional area and Young's Modulus of the pillar, respectively.

Since $\Delta P_{max}$ and $P_3$ can be expressed as functions of pillar geometries and mechanical properties, one can engineer a transformable surface according to the drop impact environment. As an order of magnitude comparison, one can show that for fixed pillar geometries and arrangements, $\Delta P_{max} \ll P_B$ for microtextured surface made out of hard material (i.e., E~GPa). Therefore, Eq. (2) will be the more critical design criteria. For soft material (i.e., E~100 kPa), one can show that $\Delta P_{max} \gg P_B$ and Eq. (3) will determine the Cassie-to-Wenzel transition. Note that in our analysis, $P_B$ is a function of E while $\Delta P_{max}$ is not.

Examples of useful materials that can be used for micropillars of the present disclosure include, for example, elastomers such as silicones, fluorosilicones, fluoroelastomers, perfluoroelastomers, or thermoplastics such as polyethylene, polypropylene, polycarbonate, poly(methyl methacrylate), polytetrafluoroethylene, or thermosetting polymers such as polyurethanes, epoxy resins, and any combination thereof. An array of micropillars can be formed by polymerizing a composition including a polymer forming ingredient, a curing agent, and magnetically responsive particles. The polymer forming ingredients are monomers that form the polymeric materials described above for micropillar materials, such as dimethylsiloxane, methyl methacrylate, propylene, ethylene, tetrafluoroethylene, etc. Magnetically responsive particles include, for example, magnetic metal particle such as a particle of iron, or iron oxide, etc. The particles can be in any form such as spheres, microspheres, etc. the particles can be in the composition at a weight ratio of from about 10 wt % to about 90 wt %, such as between about 50 wt % to about 85 wt %.

Advantageously, the micropillars have a textured surface such as a nonstructured surface to facility retention of lubricant thereon.

Examples of useful lubricants that can be used to infuse the micropillars include, for example, perfluorinated oils, silicone oils, polydimethysiloxane, hydroxy polydimethylsiloxane, mineral oil, plant oils, and any combination thereof.

Figures 2A, 2B:
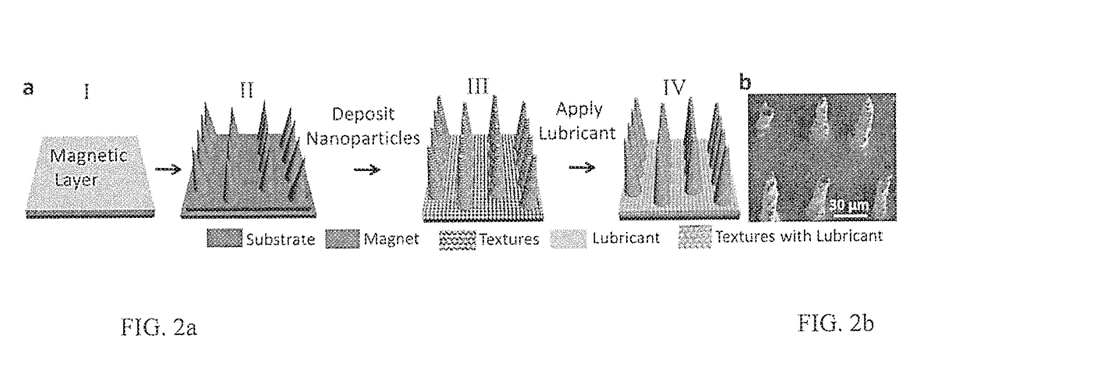
FIG. 2a shows a fabrication process.
FIG. 2b is an SEM image of the micropillars array prior to lubrication.

In an embodiment of the present disclosure, an array of magnetically responsive hierarchical micropillars can be fabricated from a mixture of polymerizable materials with magnetically responsive particles on a surface of a substrate. FIGS. 2a through 2f illustrate such a process and the performance of such a surface under different magnetic field directions according to an embodiment of the present disclosure. For example, FIG. 2a shows a fabrication process involving four steps: I) applying a compositing including polymer forming ingredients, a curing agent, and magnetically responsive particles onto a substrate; II) forming micropillars infused with magnetic nanoparticles by curing the composition in the presence of a magnetic field; III) forming a textured surface on the micropillars by self-assembling nanoparticles onto the micropillars to form hierarchal structures; IV) silanizating the surface of the hierarchal micropillars and applying a lubricate on the silanized hierarchal micropillars.

For example, to fabricate a magnetically transformable surface, we first mixed polymer forming ingredients, e.g., a polydimethylsiloxane (PDMS) pre-polymer (contained 5% equivalent curing agents), and magnetically responsive particles, e.g., carbonyl iron microspheres. The mixture is then coated onto a substrate, for this experiment, a glass substrate, to form a magnetically responsive layer (FIG. 2a). We let the mixture cure under a magnetic field by placing a magnet (with 0.4 T magnetic flux density) underneath the substrate. This yielded a uniform and ordered array of micropillars along the magnetic field direction. See M. Y Cao, et a., *Adv. Puna Mater.* 2014, 24, 3235.

Once the magnetic micropillars were formed, we introduced nanoparticles onto these micropillars to form hierarchical structures. To form the nanostructures, the micropillars were first made hydrophilic through oxygen plasma treatment so that nanoparticles, e.g., polystyrene (PS) with diameter ~200 nm, could self-assemble on the micropillars and the substrate. The resulting nanotextured micropillars help to retain a thin layer of lubricant onto the nanotextures only due to the dominance of capillary force. The sample was then silanized with a perfluorinated silane and coated with a layer of lubricant (e.g., perfluorinated oils, DuPont Krytox GPL 100) through a spin-coating process.

Figure 2C:
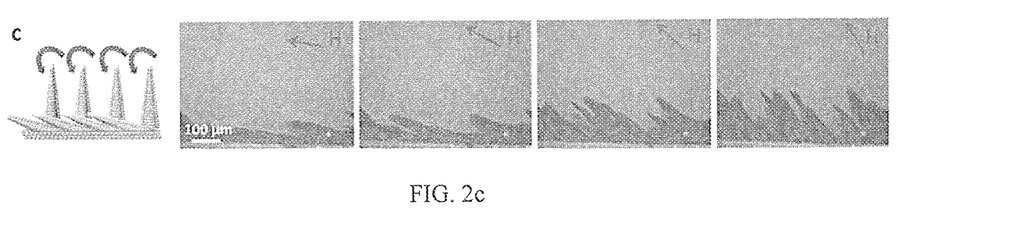
FIG. 2c are optical microscopic images showing the shape shifting performance of the micropillar array under different directions of magnetic field H. In which the micropillars can transform from fully up-right (superhydrophobic state) to nearly flattened (slippery state) morphology.

Before the lubrication, the substrate is rough at the nanoscale due to the presence of the nanoparticles on the surface of micropillars. After applying lubricant, the surface is smooth at the nanoscale as the nanoparticle assembled layer is submerged beneath the liquid lubricant. A high resolution electron micrograph shows the uniform surface morphology of the micropillars (FIG. 2b). The side view optical images of the micropillar arrays display their shape shifting ability under different magnetic field directions (FIG. 2c).

Figure 2D:
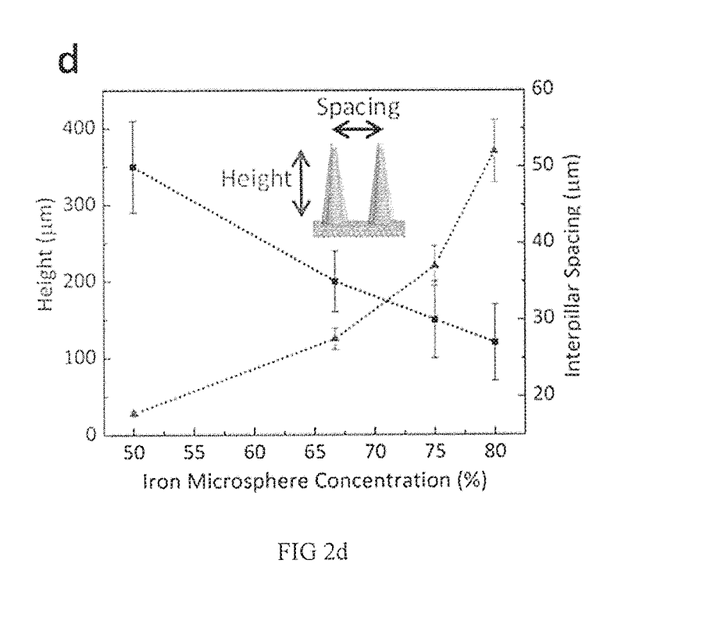
FIG. 2d is a plot showing the geometrical parameters of the micropillars as a function of the iron microsphere concentrations.
Figure 2E:
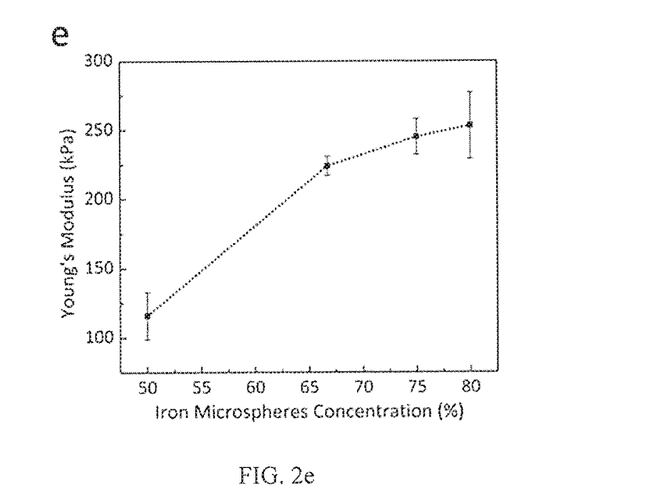
FIG. 2e is a plot showing the Young's moduli of various iron microspheres-infused PDMS concentrations.
Figure 2F:
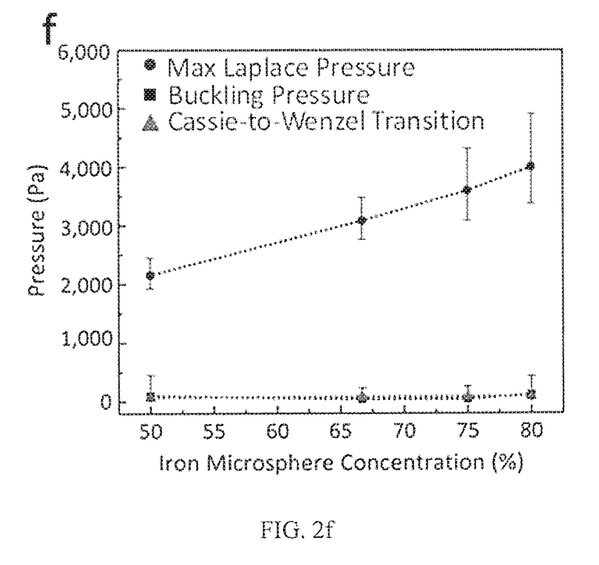
FIG. 2f is a plot showing an order of magnitude comparison between the experimentally measured dynamic pressures of the impacting droplets at Cassie-to-Wenzel transition and the estimated maximum Laplace pressure and buckling pressure of the micropillar arrays. Error bars represent standard deviations from at least 3 independent measurements.

The geometries and the mechanical properties of the micropillar array can be tuned by adjusting the concentrations of magnetic microparticles (FIG. 2d, 2e). In our experiments, we varied the iron particle concentration from 50 wt % to 80.0 wt %; the respective resulting micropillar heights vary from 28±3 μm to 370±41 μm with a interpilar spacing from 50±6 μm to 27±5 μm (FIG. 2d), and the Young's moduli range from 116±17 kPa to 253±24 kPa (FIG. 2e). Using a drop impact test (see Methods), we quantified the dynamic pressure of the impacting droplets at which the Cassie-to-Wenzel transition occurs for each of our surfaces. The experimentally determined dynamic pressures are of the same order of magnitude of the estimated $P_B$ but much lower than estimated $\Delta P_{max}$ (FIG. 2f). This further reinforces that the superhydrophobic performance is highly dependent on the mechanical properties of soft micropillar arrays.

Figure 3A:
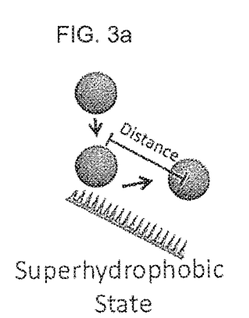
FIG. 3a shows an array of micropillars in the upright state, in which a water droplet can completely bounce off the surface, exhibiting superhydrophobic behavior.
Figure 3B:
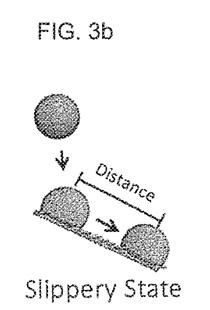
FIG. 3b shows that the surface can be switched from a superhydrophobic to slippery mode and can repel water droplets.
Figure 3C:
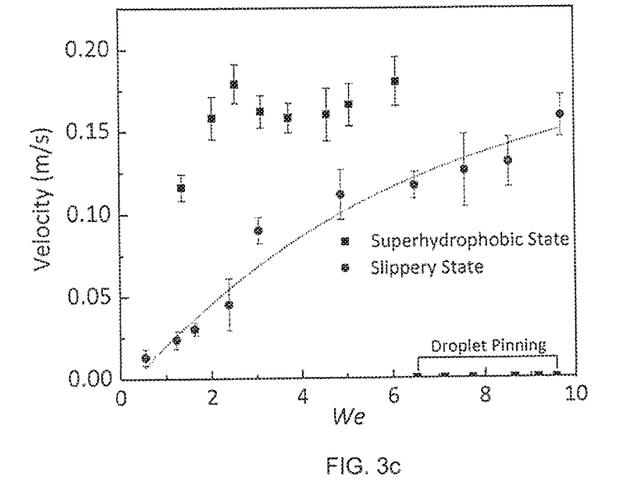
FIG. 3c is a plot showing measured droplet removal velocity.

To demonstrate that our transformable surface can exhibit both superhydrophobic and slippery properties and can switch between these two states, we have carried out static and dynamic wetting characterizations. The results are shown in FIGS. 3a-3c. FIG. 3a is an embodiment when 75 wt % iron particle concentration micropillars were in the upright state, a water droplet with We=2.72 can completely bounce off from the surface, exhibiting superhydrophobic behavior. FIG. 3b shows that by switching the surface from superhydrophobic to slippery mode, the surface can repel the liquid droplets at a much higher We number (i.e., We>7.13). Insets show the apparent static contact angles, θ*, of water droplets (15 μL drop volume) on the corresponding surfaces. FIG. 3c is a plot showing measured droplet removal velocity (i.e., droplet velocity parallel to the surface after initial impact with surface) at the superhydrophobic and slippery states as a function of We. The average velocity was estimated by measuring the time required for a liquid droplet to transverse across a distance of ~0.64 mm along a tilted sample (tilt angle ~20°).

In the static experiments, we found that when the micropillars are in the vertical direction, a water droplet sitting on any of our surfaces was in the Cassie state; the droplet exhibited very high static contact angle (CA) (i.e., >150°) with low contact angle hysteresis, and could roll off the surface at small tilting angles (<5°), as shown in FIG. 3a inset. In addition, we performed dynamic wetting experiments by dropping droplets on the transformable surfaces at various velocities. To characterize the drop impact dynamics, we used a dimensionless number, Weber number (We), which can be defined as We=$\rho V^2 D/\gamma$, where $\rho$ is the liquid density, V is the impact velocity, D is the droplet diameter and $\gamma$ the surface tension of the droplet (see Methods). For micropillar arrays comprised of ~75.0 wt % A iron particles, impacting water droplets (We~6.0) completely bounce off, exhibiting superhydrophobic behavior (see FIG. 3a). These wetting characteristics are consistent with a surface in a superhydrophobic state.

In an aspect of the present disclosure, the surface character of a substrate, which includes an array of magnetically responsive hierarchical micropillars and a lubricant layer conformally infused thereon, can be switched by changing the orientation of the array of micropillars with an external magnetic field. For example, by applying external magnetic field (from a RdFeB magnet, >0.1 T) at various angles, the micropillars shifted their orientations and can be in contact with adjacent micropillars to form a relatively flat surface, as verified by our observations through an optical microscope (see FIG. 2b). In this case, the droplet was in direct contact with a nearly continuous film of lubricant. Here, the measured static CA is 102.8±2.5°, and the sliding angle is 6±1° (15 μL drop volume), as shown in FIG. 3b inset. In addition, a water droplet impacting on the surface (when We~6.0) will slide off instead of bouncing off from the surface (FIG. 3b). These wetting characteristics are similar to those of a SLIPS. Therefore, the transformable surface can display either superhydrophobic or slippery properties as controlled by the external magnetic fields.

We systematically characterized the average droplet removal velocity on the transformable surface in both the superhydrophobic and slippery states under different We (FIG. 3c). Since liquid droplets typically undergo bouncing or sliding motions in the superhydrophobic and slippery states, respectively, we estimated the average removal velocity (i.e., droplet velocity parallel to the surface) by measuring the time required for a liquid droplet to transverse across a fixed distance from the point of impact (i.e., ~0.64 mm). In the superhydrophobic state, liquid droplets were removed at a speed >0.1 m/s at We<6. At higher We, liquid droplets pinned onto the surface and became immobile. In the slippery state, liquid droplets slid across the surface at a relatively lower velocity (i.e., <0.1 m/s) at We<6, but continued to slide at a higher velocity at higher We. Owing to the distinct liquid repellent characteristics of the transformable surface, one can maintain high droplet mobility persistently on the surface by switching the liquid repellent state based on the environmental conditions.

Figure 4A:
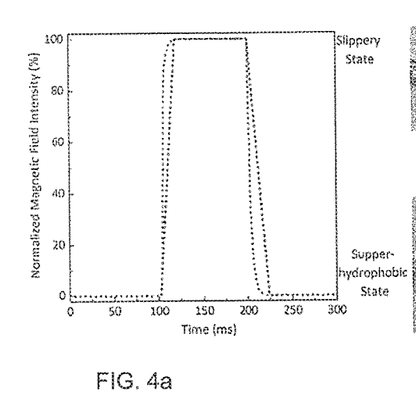
FIG. 4a is a plot showing time responses of mechanical switching of the transformable surfaces between superhydrophobic and slippery states.
Figure 4B:
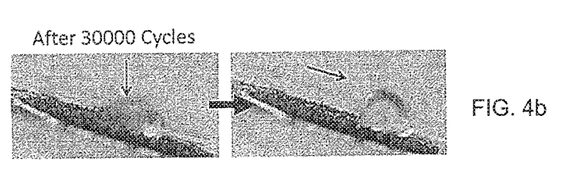
FIGS. 4b and 4c are optical images showing the performance of the transformable surfaces after continuous operations for 30000 cycles in the superhydrophobic state and in the slippery state, respectively.
Figure 4C:
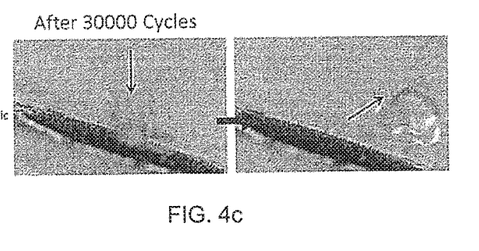

The ability to quickly and repeatedly switch between superhydrophobic and slippery states will allow the maintenance of liquid repellency in fast changing dynamic environmental conditions. Therefore, we further characterized our surfaces by measuring the response time of the mechanical switching of the transformable surface with respect to the applied magnetic field. To test the mechanical response time, we applied a magnetic field using an electromagnet applied at a specific frequency (i.e., 10 Hz), and used a high speed camera to observe the mechanical switching behaviors of the transformable surface. FIGS. 4a-4c illustrate switching time and cyclability between superhydrophobic and slippery states. FIG. 4a is a plot showing time responses of mechanical switching of the transformable surfaces between superhydrophobic and slippery states. FIGS. 4b and 4c are optical images showing the performance of the transformable surfaces after continuous operations for 30000 cycles in the superhydrophobic state and in the slippery state, respectively.

We estimated that the time for the full magnetic field establishment for the electromagnet is ~0.015 sec based on measured resistance and inductance of the electromagnet (Supplementary Information). We also measured the time required for individual micropillars to change from a predominately perpendicular (e.g., up-right) position relative to the substrate to a predominately parallel (e.g., nearly flattened) position based on the images obtained from a high speed camera. Based on our measurements, the typical mechanical switching time of the sample prepared with 66.7 wt % iron microspheres concentration is ~0.020 sec, as shown in FIG. 4a. We have further shown that the switching between the superhydrophobic and slippery states is highly repeatable without noticeable failure even after >30000 cycles (FIG. 4b, 4c).

An advantageous function of our transformable surface is its ability to restore its liquid repellent function even when water droplets are pinned onto the surface. To illustrate this advantage, we conducted the following test. While our surface was in the superhydrophobic state, we dropped water droplets at a relatively high Weber number (i.e., We>7), such that the water droplet becomes completely impregnated into the surface textures, rendering the droplet immobile (i.e., failure mode of the superhydrophobic surface). To restore the liquid repellent function, we applied an external magnetic field to change the orientation of the micropillars from up-right to nearly flat morphology (i.e., slippery state). The change of the surface morphology resulted in the depinning and sliding of the liquid droplet, thereby restoring the liquid repellent function.

Figure 5A:
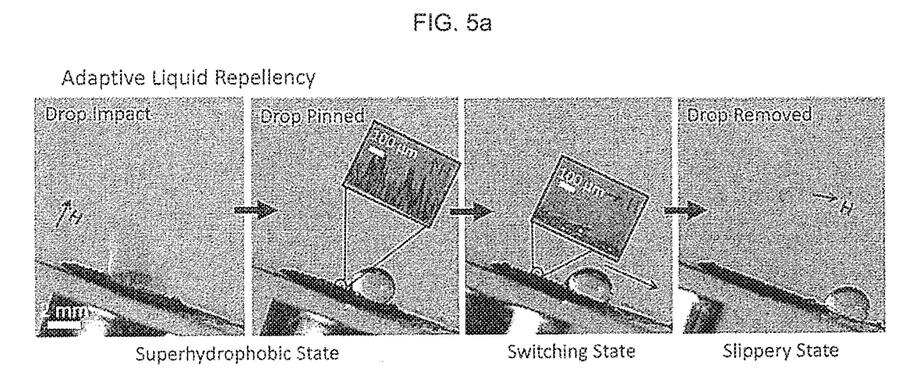
FIG. 5a shows a series of pictures in which a water droplet is fully impregnated into the surface textures in the superhydrophobic state under high droplet impact pressure and becomes immobile.
Figure 5B:
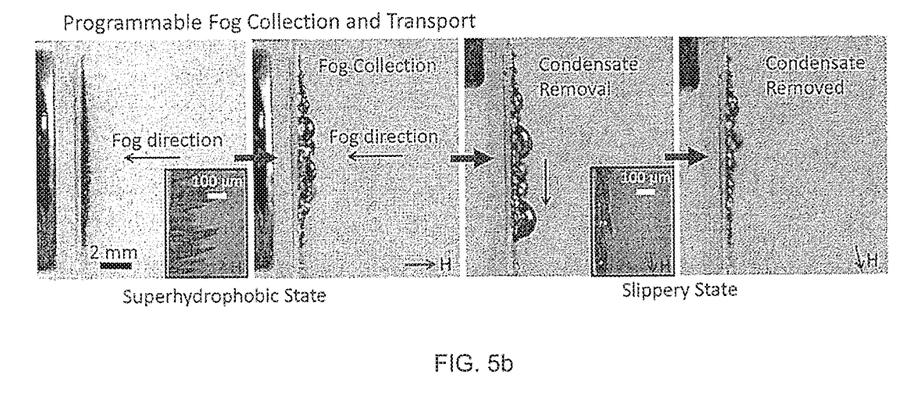
FIG. 5b shows a services of pictures that implement an array of magnetically responsive hierarchical micropillars with a programmable fog collection and transport device.
Figure 6:
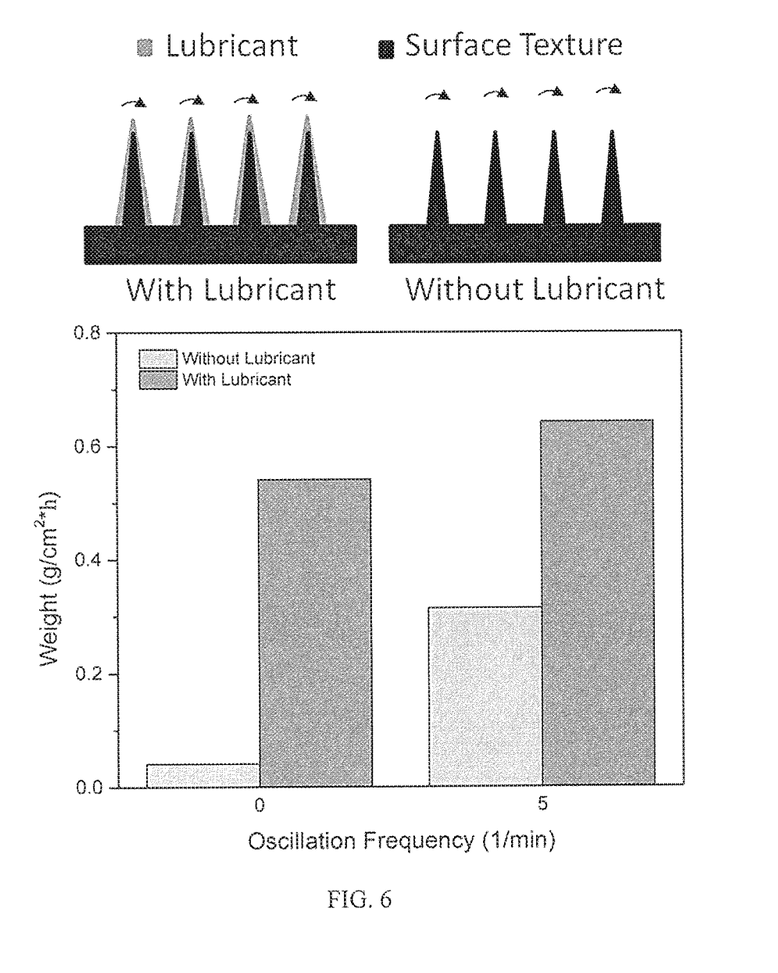
FIG. 6 shows the water harvesting rates of lubricated and non-lubricated switchable surfaces with and without switching.

FIGS. 5a-5b illustrate examples of using a switchable surface comprising an array of magnetically responsive hierarchical micropillars. FIG. 5a shows a series of pictures in which a water droplet is fully impregnated into the surface textures in the superhydrophobic state under high droplet impact pressure and becomes immobile. By transforming the surface textures from up-right to flattened morphology, the liquid droplet was depinned and slid off from the surface. FIG. 5b shows a services of pictures that implement an array of magnetically responsive hierarchical micropillars with a programmable fog collection and transport device. The transformable surface was placed normal to the direction of the incoming fog. In the superhydrophobic state, the micropillars collect the fog from air utilizing their high surface area. The condensate was then removed from the surface by switching to the slippery state.

This demonstration illustrates that our transformable surface can address the failure mode of superhydrophobic surface by first switching the surface to the slippery mode to remove the pinned water droplet, and switching back to (and thus restoring) the superhydrophobic mode. Such a precise control allows the transformable surface to be used as an adaptive liquid repellent system. To achieve high droplet mobility, one can adopt the superhydrophohic mode; to repel liquid droplets under pressure, for example, the slippery mode can be activated to retain its liquid repellency.

In addition to the adaptive liquid repellent system, the transformable surface can be used with programmable fog harvesting (FIG. 5). In the superhydrophobic state, the high surface area of micropillars allows the rapid collection of tiny water droplets in air. Once the captured condensate volume is sufficiently large, the transformable surface can be switched to the slippery state to remove the excess condensate by gravity. One may also optimize the fog harvesting rate by programming the transformable surfaces based on the environmental conditions (e.g., humidity, wind speed and direction etc.) with a programmable controller such as a microprocessor.

Examples

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

Preparation of magnetically transformable surface: The micropillar arrays of the transformable surface were fabricated using a magnetic particle-assisted molding process. In this process, PDMS pre-polymer (containing ~5 wt % curing agents; purchased from Dow Corning, SYLGARD 184) and carbonyl iron microspheres (purchased from chemicalstore.com, with diameter of 3 to 10 microns) with various weight ratios were mixed thoroughly using a planetary centrifugal mixer (Thinky, USA). The mixture was then coated onto a cover glass slide. By placing a permanent magnet (with a magnetic flux density ~4 T) underneath the substrate, uniform and ordered micropillar arrays were firmed along the magnetic field direction. These micropillar arrays were left in the magnetic field at room temperature for 24 hrs for the complete curing of the final mixture. They were then treated with oxygen plasma to create a hydrophilic surface. 10 µL of polystyrene nanoparticles suspension with a concentration of 0.15 wt % was deposited onto the micropillar arrays. The substrate was kept at room temperature for 10 min so that the nanoparticles could self-assemble by solvent evaporation. The thickness of the assembly can be controlled by repeating the process several times. The hierarchical micropillar arrays were silanized using 1H, 1H, 2H, 2H-perfluorooctyltriethoxysilane (Sigma-Aldrich) inside a vacuum chamber for 4 hrs. After the silanization step, a perfluorinated lubricant (e.g., DuPont Krytox oils) was coated onto the silanized micropillars using a spin-coater spinning at around 500 RPM for several seconds.

Drop impact experiments: In our experiments, surfaces with micropillar arrays were placed at a tilted angle of ~25°. We adjusted the release height of the water droplet in order to change We. Deionized water droplets of 10 L were dispensed from a syringe (Hamilton) at specific heights. The radius, R, and the droplet velocity, V, and release height h, were measured from a high speed camera (Phantom Miro M320S). Specifically, h was determined from the center of mass of the droplet using the Phantom Camera Control Application software. The diameter of the water droplet is ~1.25 mm with a volume of 10 µL. The droplet impact dynamics were recorded from the side view using the high-speed video camera with a typical frame rate of 1700 fps.

The present disclosure describes and demonstrates a substrate with a switchable surface that can switch between and display interfacial functions attributed to individual biological species selectively by transforming the surface morphologies. While this work focuses on liquid-repellent materials, it can be extended to other interfacial functions such as adhesion and optical properties derived from multiple biological species as many of these natural interfacial functions are enabled by the micro/nanoscale surface textures. The ability to control interfacial properties on-demand allow for a new class of programmable interfacial materials with applications including adaptive skin friction and adhesion control, dynamic flow control, camouflage, and thermal regulation.

Only the preferred embodiment of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed:

1. A substrate with a switchable surface, comprising:
    an array of magnetically responsive micropillars, each of the micropillars including a flexible polymer and a magnetically responsive particle; and
    a lubricant layer conformally infused onto the micropillars,
    wherein the micropillars have a first orientation predominately upright relative to the surface corresponding to a superhydrophobic state of the switchable surface and a second orientation angled relative to the first orientation corresponding to a slippery state of the switchable surface.

2. The substrate according to claim 1, wherein the magnetically responsive micropillars are hierarchical micropillars having self-assembling nanoparticles forming a textured surface on the micropillars.

3. The substrate of claim 1, wherein the magnetically responsive particle is an iron microsphere.

4. The substrate of claim 1, wherein the flexible polymer comprises polydimethylsiloxane.

5. The substrate of claim 1, wherein the lubricant comprises a perfluorinated oil, a silicone oil, a polydimethylsiloxane, a hydroxy polydimethylsiloxane or any combination thereof.

6. A method of switching a surface character of a substrate with a switchable surface, the method comprising the step of:
    providing a substrate with a switchable surface, including:
        an array of magnetically responsive micropillars, each of the micropillars including a flexible polymer and a magnetically responsive particle; and
        a lubricant layer conformally infused onto the micropillars,
        wherein the array of micropillars has a first orientation predominately upright relative to the surface corresponding to a superhydrophobic state of the switchable surface and a second orientation angled relative to the first orientation corresponding to a slippery state of the switchable surface; and
    applying an external magnetic field to the substrate, thereby changing the orientation of the array between the first and second orientations and causing the switching of the surface between the superhydrophobic and slippery states.

7. The method of claim 6, comprising orienting the array predominately parallel relative to the substrate.

8. The method of claim 6, comprising repeatedly changing the orientation of the array.

9. A water harvesting device comprising a substrate of claim 1.

10. The method of claim 6, comprising orienting the array predominately perpendicular relative to the substrate.

11. The method according to claim 6, further comprising the step of restoring the superhydrophobic state by first switching the surface to the slippery state to remove pinned water droplets.

* * * * *